(12) United States Patent
Lam

(10) Patent No.: US 8,743,073 B2
(45) Date of Patent: *Jun. 3, 2014

(54) TWO-WAY TOUCH-SCREEN BASED COMMUNICATION SYSTEM

(71) Applicant: TUMCW Inc., San Francisco, CA (US)

(72) Inventor: Andy Lam, San Francisco, CA (US)

(73) Assignee: The Usual, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/866,038

(22) Filed: Apr. 19, 2013

(65) Prior Publication Data

US 2013/0231993 A1 Sep. 5, 2013

Related U.S. Application Data

(63) Continuation of application No. 13/078,946, filed on Apr. 2, 2011, now Pat. No. 8,436,826.

(51) Int. Cl.
G06F 3/041 (2006.01)
(52) U.S. Cl.
USPC ............................................. 345/173; 705/15
(58) Field of Classification Search
USPC ............... 345/1.2, 173; 340/286.01; 707/705, 707/758; 705/15, 26.8; 715/798, 800, 801
See application file for complete search history.

(56) References Cited

U.S. PATENT DOCUMENTS

| 5,235,509 | A | 8/1993 | Mueller et al. |
| 5,991,739 | A | 11/1999 | Cupps et al. |
| 6,611,811 | B1 * | 8/2003 | Deaton et al. ............... 705/14.39 |
| 7,174,308 | B2 | 2/2007 | Bergman et al. |
| 7,302,403 | B1 | 11/2007 | Landau et al. |
| 7,343,174 | B2 | 3/2008 | Suryanarayana et al. |
| 7,568,618 | B1 | 8/2009 | Scutellaro et al. |
| 7,724,716 | B2 | 5/2010 | Fadell |
| 7,762,181 | B2 | 7/2010 | Boland et al. |
| 7,818,191 | B2 | 10/2010 | Lutnick et al. |

(Continued)

FOREIGN PATENT DOCUMENTS

| WO | 2003067369 A2 | 8/2003 |
| WO | 2003067493 A1 | 8/2003 |
| WO | 2006126996 A1 | 11/2006 |

OTHER PUBLICATIONS

Notification of Transmittal of the International Search Report and the Written Opinion of the International Searching Authority, PCT/US2011/037490, Apr. 6, 2012.

(Continued)

Primary Examiner — Joe H Cheng
(74) Attorney, Agent, or Firm — SU IP Consulting

(57) ABSTRACT

Embodiments of the disclosure generally set forth a two-way touch screen based communication system. One example method may include receiving an order for an item from a first touch screen device via a first network, wherein the order is associated with a first identification for a merchant, a second identification for the customer, and a negotiable parameter reflective of a preference of the customer. The method may also include making available the order for a second touch screen device of the merchant to retrieve via a second network and to display and prior to completing processing of the order, transmitting a first response to the preference of the customer to the first touch screen device via the first network.

6 Claims, 4 Drawing Sheets

(56) References Cited

U.S. PATENT DOCUMENTS

| | | |
|---|---|---|
| 7,974,873 B2 | 7/2011 | Simmons et al. |
| 8,190,483 B2 | 5/2012 | Woycik et al. |
| 8,200,550 B2 | 6/2012 | Aitkins |
| 2001/0047302 A1* | 11/2001 | Yoshinaga et al. ............... 705/15 |
| 2001/0049636 A1 | 12/2001 | Hudda et al. |
| 2002/0133418 A1 | 9/2002 | Hammond et al. |
| 2002/0138350 A1 | 9/2002 | Cogen |
| 2003/0046166 A1 | 3/2003 | Liebman |
| 2003/0078793 A1 | 4/2003 | Toth |
| 2003/0208409 A1 | 11/2003 | Mault |
| 2004/0015403 A1 | 1/2004 | Moskowitz et al. |
| 2004/0015414 A1 | 1/2004 | Sidlo et al. |
| 2004/0054592 A1 | 3/2004 | Hernblad |
| 2004/0143503 A1 | 7/2004 | Suthar |
| 2004/0158499 A1 | 8/2004 | Dev et al. |
| 2004/0214597 A1 | 10/2004 | Suryanarayana et al. |
| 2005/0015301 A1 | 1/2005 | Johnson |
| 2005/0059414 A1 | 3/2005 | Mahmoodi et al. |
| 2005/0182681 A1 | 8/2005 | Bruskotter et al. |
| 2005/0273345 A1 | 12/2005 | Castillejo Romero |
| 2006/0196935 A1 | 9/2006 | Muto |
| 2006/0218040 A1 | 9/2006 | Sabapathypillai |
| 2007/0088624 A1 | 4/2007 | Vaughn et al. |
| 2007/0203807 A1 | 8/2007 | DeAngelis |
| 2007/0239565 A1 | 10/2007 | Pentel |
| 2008/0128497 A1 | 6/2008 | Teraoka et al. |
| 2008/0183593 A1 | 7/2008 | Dierks |
| 2008/0195621 A1 | 8/2008 | Tedesco et al. |
| 2009/0076920 A1 | 3/2009 | Feldman et al. |
| 2009/0089183 A1 | 4/2009 | Afram et al. |
| 2009/0132379 A1 | 5/2009 | Baril et al. |
| 2009/0167553 A1 | 7/2009 | Hong et al. |
| 2009/0259553 A1* | 10/2009 | Carroll et al. .................... 705/15 |
| 2009/0265247 A1* | 10/2009 | Carroll et al. .................... 705/15 |
| 2009/0281903 A1 | 11/2009 | Blatstein |
| 2009/0313132 A1 | 12/2009 | McKenna et al. |
| 2010/0076853 A1 | 3/2010 | Schwarz |
| 2011/0242034 A1 | 10/2011 | Lam |

OTHER PUBLICATIONS

"Touchscreen Table Surfaces," Appliance Design, vol. 56, Issue 8, U.S., Aug. 2008.

\* cited by examiner

400

404 A signal bearing medium 402 at least one of one or more instructions for receiving an order for a food item submitted by the first touch screen device via a first network, wherein the order is associated with a first identification for a merchant, a second identification for the customer, and a negotiable parameter reflective of a preference of the customer;

one or more instructions for making available the order for a second touch screen device of the merchant to retrieve via a second network and to display; and/or one or more instructions, prior to completing processing of the order, for transmitting a first response to the preference of the customer to the first touch screen device via the first network, wherein the first response is submitted by the second touch screen device 406 a recordable medium 408 a non-transitory computer readable medium

FIG. 4

TWO-WAY TOUCH-SCREEN BASED COMMUNICATION SYSTEM

CROSS-REFERENCE TO RELATED APPLICATIONS

This application is a continuation of U.S. patent application Ser. No. 13/078,946 filed on Apr. 2, 2011, which claims the benefit of the U.S. Provisional Application No. 61/320,527, filed on Apr. 2, 2010. The related applications are hereby incorporated by reference in their entireties.

BACKGROUND

Customers and merchants currently have, via the Internet, phone, and in-person, a variety of mechanisms for two-way communication that make it possible to facilitate business communications. However, current business communication mechanisms are deficient in accuracy, efficiency, convenience, and personalization when used as an ordering system. The convenience and practicality of current loyalty rewards systems, the efficiency and specificity of advertising opportunities for merchants, and the security and convenience of the current payments settlement system are also deficient. This is because traditional communications between customers and merchants have primarily been either direct, real-time in-person contacts or phone orders. Non-digital and non-targeted offline and online advertising are sub-optimal.

BRIEF DESCRIPTION OF THE DRAWINGS

FIG. 4 is a block diagram of an illustrative embodiment of a computer program product for implementing a process for managing the two-way communication between a first touch screen device of a customer and a second touch screen device of a merchant, all arranged in accordance with at least some embodiments of the present disclosure.

DETAILED DESCRIPTION

Figure 1:
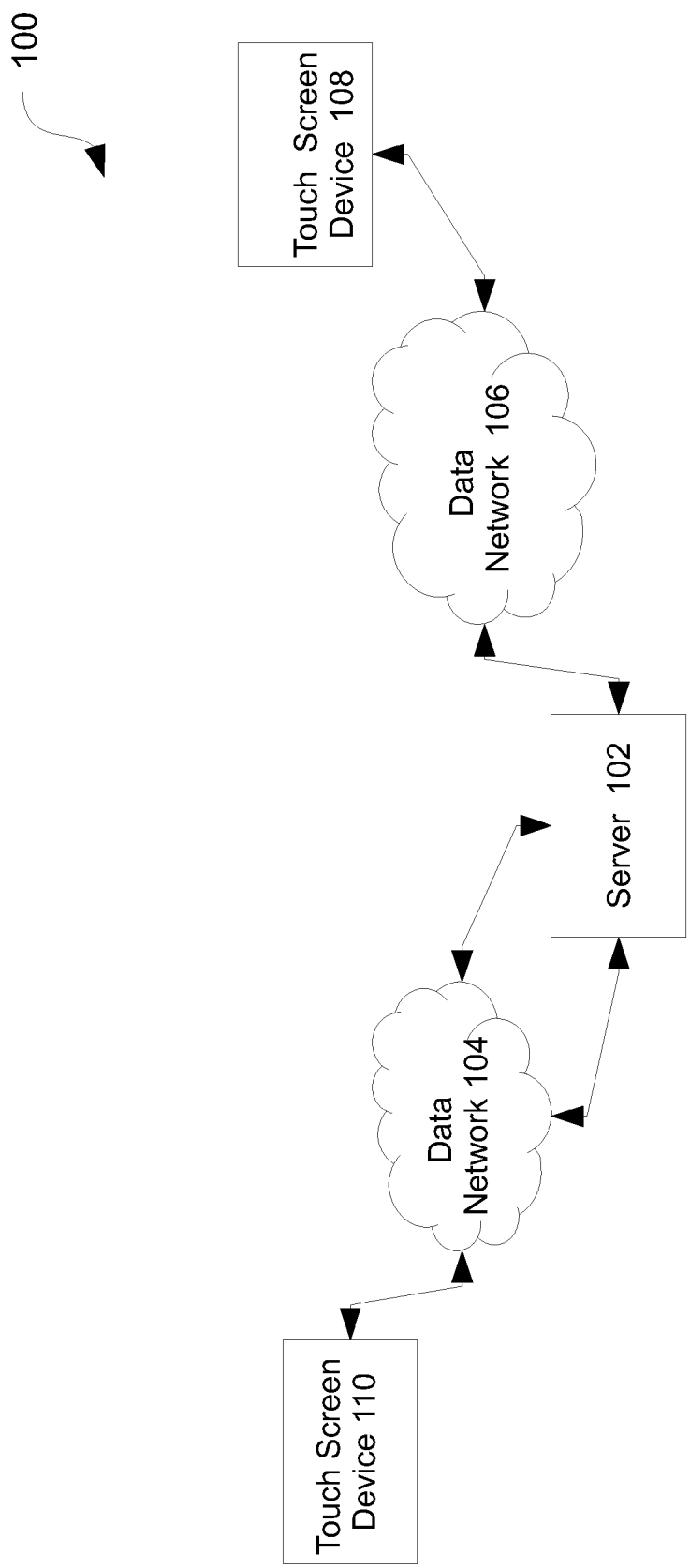
FIG. 1 is a block diagram of an example communication system 100 between a touch screen device 110 of a customer and a touch screen device 108 of a merchant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to two-way touch screen based communications. Throughout this disclosure, a "touch screen device" broadly refers to a general-purpose programmable device that supports a touch screen and receives at least some input data via the touch screen. Some examples of a touch screen device may include, without limitation, a tablet computing device, a smartphone, a laptop hybrid, and a touch screen laptop.

FIG. 1 is a block diagram of an example communication system 100 between a touch screen device 110 of a customer and a touch screen device 108 of a merchant, arranged in accordance with at least some embodiments of the present disclosure. The communication system 100 includes a server 102, a data network 104, and a data network 106. The touch screen device 110 is coupled to the server 102 via the data network 104, and the touch screen device 108 is coupled to the server 102 via the data network 106. In one example configuration, both of the data network 104 and the data network 106 may include one or more wireless networks, such as, without limitation, cellular networks, WiFi networks, Near Field Communication networks, Bluetooth networks, and others. Some portions of the data network 104 and the data network 106 may also include wired networks. In some implementations, the connection between the touch screen device 110 and the server 102 may be distinct from the connection between the touch screen device 108 and the server 102. For example, the touch screen device 110 may be connected to the server 102 via a cellular connection, and the touch screen device 108 may be connected to the server 102 via a WiFi connection.

Figure 2:
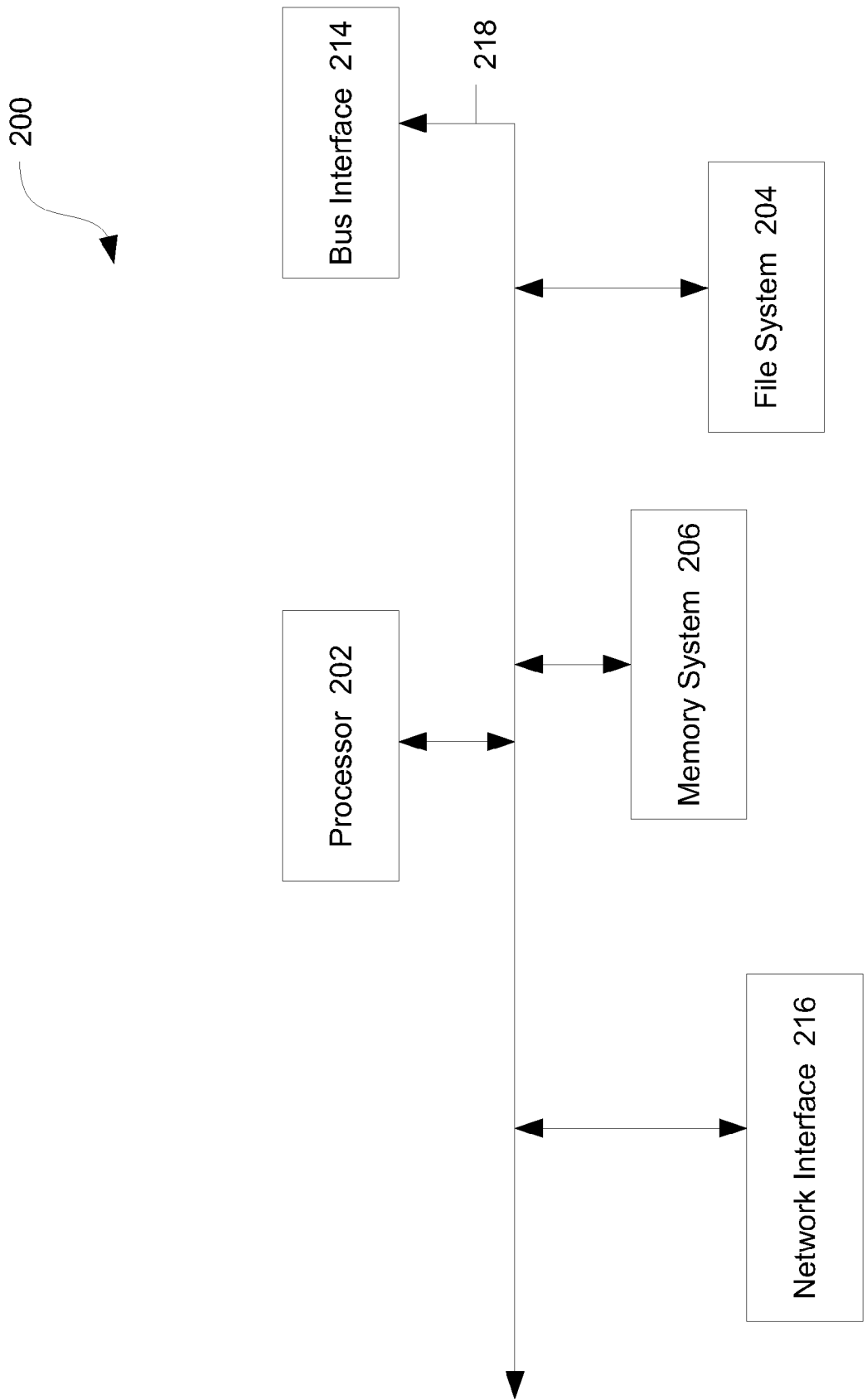
FIG. 2 illustrates a simplified configuration of a server, which is configured to support various functions of the communication system of FIG. 1.

FIG. 2 illustrates a simplified configuration of a server 200, which is configured to support various functions of the communication system 100 of FIG. 1, arranged in accordance with at least some embodiments of the present disclosure. The example server 200 may correspond to the server 102 illustrated in FIG. 1, and it may include, without limitation, a processor 202, a file system 204, a memory system 206, a bus interface 214, a network interface 216, and a data bus 218. The server 200 may also include a graphics system (not shown), a display device (not shown), and other input/output (I/O) interfaces (not shown.)

The processor 202 is generally configured to control the overall operation of the server 200. The file system 204 is generally configured to provide high capacity storage capability for the server 200. Some examples of the file system 204 may include, without limitation, one or more hard drives, flash memories, and/or solid state drives (SSD.) The memory system 206 may be configured to store programming instructions and/or data. Some examples of the memory system 206 may include, without limitation, a cache, Random-Access Memory (RAM), and/or Read-Only Memory (ROM.)

The data bus 218 may facilitate data transfer among at least the file system 204, the memory system 206, the network interface 216, and the processor 202. The bus interface 214 may allow the server 200 to couple to another device over a wired connection.

The network interface 216 may be configured to transmit and receive data over a wired network, a wireless network, and/or a combination of the two. Various networking standards may be supported, such as, without limitation, IEEE 802.11x standards, the Bluetooth standard, Near Field Communication standards, cellular wireless standards (e.g., Global System for Mobile communication (GSM), Code Division Multiple Access (CDMA), and Time Division Multiple Access (TDMA)), Ethernet, Fiber Channel fabric, and others.

Referring back to FIG. 1, in one example operation scenario, a first application may be executed on the touch screen device 110 of FIG. 1. The first application may provide a list of merchants for the customer to select from. This list may be generated based on the proximity of the merchants to the customer, the frequency of the customer's ordering at the merchants, a customer specified filter, and other factors. Once the touch screen device 110 receives a merchant selection, likely entered by the customer via the touch screen of the touch screen device 110, the first application may prompt the customer to place an order for a food item. If the customer is a returning customer for this selected merchant, then the first application may present previously-entered orders for the customer to consider. Any information relating to prior attempts to purchase or completed purchases made by the customer may be retained by the server 102 or the first application executing on the touch screen device 110. Otherwise, the first application may present the customer with options to enter a new order. The order may be transmitted through the wireless data network 104 to the server 102 and then to the touch screen device 108 via the wireless data network 106. Through this network, payment for the order may be made and processed, and loyalty rewards, if any, associated with the order may also be processed.

In some implementations, the first application may prompt the customer to log in, so that the server 102, after having authenticated the customer's identity, may retrieve history data (e.g., prior purchases and previously established customer profile) associated with the customer. The history data may be relied upon to generate recommendations.

In some implementations, each order may be associated with, without limitation, identification information for the selected merchant (e.g., alphanumeric identification, name, address, latitude and longitude, phone number, image, contact email address, authorized device(s), and others), identification information for the customer (e.g., alphanumeric identification, name, address, phone number, image, contact email address, authorized device(s), and others), and a number of parameters. Some example parameters may include the type of order (e.g., drive-through or walk-in), ordered food item (e.g., Mark's special sub), the quantity of the ordered food item (e.g., 3 Mark's special subs), the pricing related to the ordered food item (e.g., individual and/or total price), and the pick-up time for the ordered food item (e.g., picking up in 15 minutes or in 3 hours.) Some of the parameters may reflect the preferences of the customer (e.g., a preferred price, a preferred pick-up time, and others.) In addition, some of the parameters may be negotiable and thus may be adjusted. Additional examples and details will be described in subsequent paragraphs.

Figure 3:
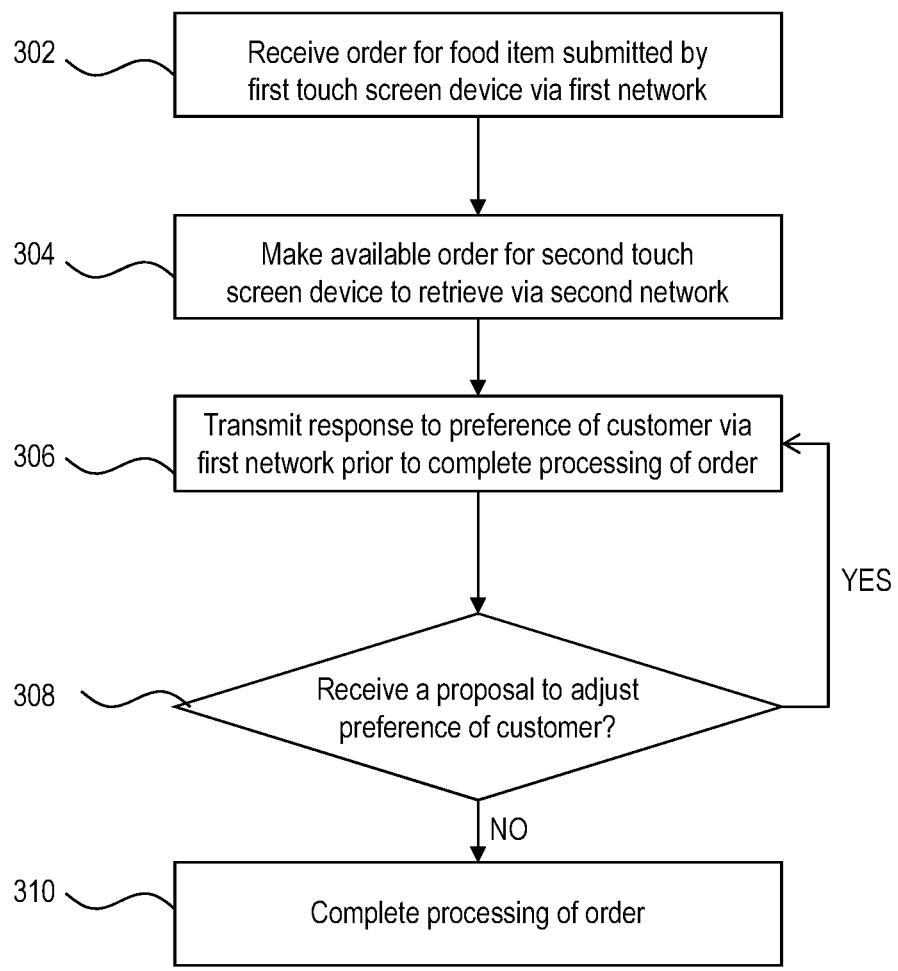
FIG. 3 is a flow chart illustrating an example process for managing the two-way communication between a first touch screen device of a customer and a second touch screen device of a merchant.

FIG. 3 is a flow chart illustrating an example process 300 for managing the two-way communication between a first touch screen device of a customer and a second touch screen device of a merchant, arranged in accordance with at least some embodiments of the present disclosure. The process 300 may include one or more functions, operations, or actions as depicted by operations 302, 304, 306, 308, and/or 310. In some implementations, the various features of the illustrated operations for the process 300 may be combined into fewer operations or divided into additional operations.

Processing for the process 300 may begin at operation 302, "receive order for food item placed by first touch screen device via first network." Operation 302 may be followed by operation 304, "make available order for second touch screen device to retrieve via second network." Operation 304 may be followed by operation 306, "transmit response to preference of customer via first network prior to complete processing of order." Operation 306 may be followed by operation 308, "receive a proposal to adjust preference of customer?" Operation 308 may be followed by either operation 306 when the decision logic tested at block 308 is satisfied (YES,) or operation 310, "complete processing of order," when the decision logic tested at block 308 is not satisfied (NO.)

In operation 302, a server, such as the server 102 of FIG. 1, may receive an order for a food item submitted by the first touch screen device of the customer, such as the touch screen device 110. As mentioned above, the order may include the identification information of the merchant, the identification of the customer, and some negotiable parameters. The server 102 may be configured to extract the identification information of the merchant from the order and identify the merchant based on the extracted information.

In operation 304, the server 102 may be configured to make the received order available for the second touch screen device of the selected merchant, such as the touch screen device 108 of FIG. 1, to retrieve. In some implementations, the server 102 may store the order in a queue associated with the extracted identification information, from which the touch screen device 108 may be configured to retrieve (or poll) from time to time. It should be noted that the server 102 may be configured to support multiple queues, one of which may be associated with the selected merchant.

In operation 306, after having retrieved the order, the touch screen device 108 may be configured to display the retrieved negotiable parameter, such as, without limitation, a pick-up time, a price, or others, that was submitted by the touch screen device 110. The negotiable parameter may contain a preference of the customer (e.g., a preferred time to pick up the ordered food item or a preferred price to pay for the ordered food item.) An application executed on the touch screen device 108 may prompt the merchant to respond to such a negotiable parameter before the order is processed any further. To illustrate, suppose the customer's preferred pick-up time is 12:30 PM. In addition to displaying the preferred 12:30 PM pick-up time, the touch screen device 108 may also display a dial to adjust the time with, an accept button to accept the time, and/or a reject button to reject the time. The merchant may use the displayed dial to adjust the time to 12:45 PM and then hit the accept button. Alternatively, the merchant may hit the accept button or the reject button without adjusting the time. The action of the merchant may be converted to a response, which is then transmitted back the server 102 via the data network 106. The server 102 then transmits the response to the touch screen device 110 of the customer via the data network 104.

In some implementations, the server 102 may be configured to transmit the history data associated with the customer to the touch screen device 108 to help the merchant determine a response to the customer's preference. For example, the customer may be a loyal customer of the merchant and thus has earned significant loyalty points issued by the merchant in the past. Such information may be displayed on the touch screen device 108, and the merchant may decide to accept the customer's preferred pick-up time without making any adjustment. Alternatively, based on the history data associated with the customer, the server 102 may instead be configured to generate a suggested response by highlighting one or more the aforementioned dial, accept button, or reject button displayed on the touch screen device 108. For example, the customer may have a history of not paying for his/her orders and making unreasonable demands, the server 102 may then be configured to suggest rejecting the order by causing the displayed reject button to be highlighted.

In some implementations, to encourage the customer to consider the merchant's response, the merchant may include in the response incentives, such as a price discount or additional loyalty program rewards. For example, in addition to the adjusted 12:45 PM pick-up time, the response may also include giving the customer a price discount for the ordered food item or awarding the customer additional loyalty points if the delayed pick-up time is accepted by the customer.

In operation 308, the server 102 may be configured to check whether it has received a proposal submitted by the touch screen device 110 to adjust the initially preference of the customer. Continuing with the earlier example, suppose the touch screen device 110 displays the adjusted 12:45 PM for the customer. An application executed on the touch screen device 110 may prompt the customer to modify, accept, or reject the merchant's suggested pick-up time. If the customer simply accepts or rejects, then the process 300 proceeds to operation 310. Otherwise, the adjusted customer preference (e.g., 12:55 PM) may be submitted by the touch screen device 110 to the server 102 via the 104, and the server 102 may then be configured to transmit the adjusted customer preference to the touch screen device 108 of the merchant via the data network 106, so that the adjusted customer preference may be displayed and considered by the merchant.

In operation 310, the server 102 may be configured to complete processing of the order. Some example tasks performed here may include, without limitation, ensuring payment from the customer has been authorized, removing the order from the queue, modifying loyalty information associated with the order (e.g., redeeming loyalty points, crediting additional loyalty points, etc.), and others.

FIG. 4 is a block diagram of an illustrative embodiment of a computer program product 400 for implementing a process for managing the two-way communication between a first touch screen device of a customer and a second touch screen device of a merchant, arranged in accordance with at least some embodiments of the present disclosure. The computer program product 400 may include a signal bearing medium 404. The signal bearing medium 404 may include one or more sets of executable instructions 402 that, when executed by, for example, a processor, may provide the functionality described above with respect to FIG. 3. Thus, for example, referring to the server 200 of FIG. 2, the processor 202 of the server 200 may undertake one or more of the operations shown in FIG. 3 in response to the instructions 402 conveyed to the server 200 by the signal bearing medium 404.

In some implementations, the signal bearing medium 404 may encompass a non-transitory computer readable medium 408, such as, but not limited to, a hard disk drive, a Compact Disc (CD), a Digital Video Disk (DVD), a digital tape, memory, etc. In some implementations, the signal bearing medium 404 may encompass a recordable medium 406, such as, but not limited to, memory, read/write (R/W) CDs, R/W DVDs, etc. The computer program product 400 may be recorded on the non-transitory computer readable medium 408 or another similar recordable medium 406.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

I claim:

1. A method for communicating with a first touch screen device of a customer, comprising:
   receiving an order for an item submitted by the first touch screen device via a first network, wherein the order is associated with a first identification for a merchant, a second identification for the customer, and a negotiable parameter reflective of a preference of the customer;
   making available the order for a second touch screen device of the merchant to retrieve via a second network and to display; and
   prior to completing processing of the order, transmitting a first response to the preference of the customer to the first touch screen device via the first network.

2. The method of claim 1, wherein the negotiable parameter is associated with time or a price.

3. The method of claim 1, wherein the first response is a proposal to modify the preference of the customer, further comprising:
   receiving the negotiable parameter associated with the order, wherein the negotiable parameter is reflective of a modified preference of the customer;
   making available the modified preference of the customer for the second touch screen device to retrieve via the second network and to display; and
   prior to completing processing of the order, transmitting a second response to the modified preference of the customer to the first touch screen device via the first network.

4. A method for communicating with a first touch screen device of a customer, comprising:
   receiving an order for an item from the first touch screen device via a first network, wherein the order is associated with a first identification for a merchant, a second identification for the customer, and a negotiable parameter reflective of a preference of the customer;
   making available the order for a second touch screen device of the merchant to retrieve via a second network and to display; and
   prior to completing processing of the order, transmitting a first response to the preference of the customer to the first touch screen device via the first network, wherein the first response is from the second touch screen device.

5. The method of claim 4, wherein the negotiable parameter is associated with time or a price.

6. The method of claim 4, wherein the first response is a proposal to modify the preference of the customer, further comprising:
   receiving the negotiable parameter associated with the order, wherein the negotiable parameter is reflective of a modified preference of the customer;
   making available the modified preference of the customer for the second touch screen device to retrieve via the second network and to display; and
   prior to completing processing of the order, transmitting a second response to the modified preference of the customer to the first touch screen device via the first network.

* * * * *

UNITED STATES PATENT AND TRADEMARK OFFICE
CERTIFICATE OF CORRECTION

| | | |
|---|---|---|
| PATENT NO. | : 8,743,073 B2 | Page 1 of 1 |
| APPLICATION NO. | : 13/866038 | |
| DATED | : June 3, 2014 | |
| INVENTOR(S) | : Andy Lam | |

It is certified that error appears in the above-identified patent and that said Letters Patent is hereby corrected as shown below:

On the Title page, Item (63), under "Related U.S. Application Data," delete "Continuation of application No. 13/078,946, filed on Apr. 2, 2011, now Pat. No. 8,436,826" and insert -- Continuation of application No. 13/078,946, filed on Apr. 2, 2011, now Pat. No. 8,436,826, which is a nonprovisional application of provisional application No. 61/320,527, filed on Apr. 2, 2010 --, therefor.

Signed and Sealed this
Seventeenth Day of February, 2015

Michelle K. Lee
*Deputy Director of the United States Patent and Trademark Office*